United States Patent [19]

Dubois et al.

[11] Patent Number: 4,914,905
[45] Date of Patent: Apr. 10, 1990

[54] AIR DEFLECTOR FOR A TURBOFAN ENGINE THRUST REVERSER

[75] Inventors: Claude A. G. Dubois, Honfleur; Jean-Marie L. Gely; Guy B. Vauchel, both of Le Havre, all of France

[73] Assignee: Societe anonyme dite Hispano-Suiza, Saint-Cloud, France

[21] Appl. No.: 311,858

[22] Filed: Feb. 17, 1989

[30] Foreign Application Priority Data

Feb. 25, 1988 [FR] France ................................. 88 02283

[51] Int. Cl.$^4$ ............................................. F02K 1/64
[52] U.S. Cl. ...................................... 60/226.2; 60/230; 239/265.29
[58] Field of Search ....................... 60/226.2, 229, 230; 239/265.27, 265.29, 265.31; 244/110 B, 12.5

[56] References Cited

U.S. PATENT DOCUMENTS

| | | |
|---|---|---|
| 3,262,268 | 7/1966 | Beavers ................................... 60/230 |
| 3,605,411 | 9/1971 | Maison et al. ...................... 60/226.2 |
| 3,612,401 | 10/1971 | Ellis et al. ........................ 239/265.29 |
| 3,747,855 | 7/1973 | Vdoviak et al. ................. 239/265.29 |
| 4,177,639 | 12/1979 | Taylor ................................ 60/226.2 |
| 4,410,152 | 10/1983 | Kennedy et al. ................. 244/110 B |
| 4,485,970 | 12/1984 | Fournier et al. ............... 239/265.29 |
| 4,545,199 | 10/1985 | Sankey et al. .................. 239/265.31 |
| 4,564,160 | 1/1986 | Vermilye ........................... 60/226.2 |

FOREIGN PATENT DOCUMENTS

| | | |
|---|---|---|
| 2731721 | 1/1978 | Fed. Rep. of Germany ..... 60/226.2 |
| 2486153 | 1/1982 | France . |
| 2506843 | 12/1982 | France . |
| 2559838 | 8/1985 | France . |
| 1177864 | 1/1970 | United Kingdom . |
| 1276265 | 6/1972 | United Kingdom ........... 239/265.29 |
| 1343888 | 1/1974 | United Kingdom ........... 239/265.29 |

Primary Examiner—Donald E. Stout
Attorney, Agent, or Firm—Bacon & Thomas

[57] ABSTRACT

The present invention provides a movable air deflector which, in a first position, deflects air passing through the cold flow air duct of a turbofan engine in a direction such that it approximates the theoretical air flow line and does not enter a cavity defined by the interior of the thrust reverser door when the door is in its closed position. A linkage mechanism connects the air deflector to the door actuator, such that, when the door is moved to its opened or thrust reversing position, the deflector is moved to a second position so as to minimize its interference with the thrust reversing air flow.

2 Claims, 5 Drawing Sheets

AIR DEFLECTOR FOR A TURBOFAN ENGINE THRUST REVERSER

BACKGROUND OF THE INVENTION

The present invention relates to a thrust reverser for a turbofan-type turbojet engine, more particularly an air deflector for such a thrust reverser to minimize disturbances in the air when the thrust reverser is in the forward thrust position.

Turbofan-type turbojet engines are, of course, well known in the art and typically comprise an air duct located around the turbojet engine to direct air flow generated by a turbofan in a downstream direction to augment the thrust of the turbojet engine. Thrust reversers are also well known in the art and, when utilized on such turbofan engines with a high bypass ratio (e.g. the ratio of air passing through the air flow or cold flow duct with respect to the hot gas emanating from the turbojet engine exhaust) it is known to utilize the thrust reversers to redirect only the cold flow air passing though the air flow duct. Typically, such thrust reversers comprise one or more pivotable doors, movable between a forward thrust position in which the door is generally flush with the outer housing defining the outer oundary of the cold flow duct, and a thrust reversing position in which the forward edge of the door is moved outwardly such that a rear or downstream edge portion of the door blocks off the cold flow air duct so as to redirect the air in a direction having a reverse thrust component.

A typical thrust reverser is illustrated in FIGS. 1 and 2 wherein an outer housing 1 defining the outer boundary of the air flow duct is concentrically arranged about the turbojet engine (not shown). The outer housing comprises an outer surface panel 4, an inner surface panel 5 and a frame member 6 interconnecting the inner and outer panels.

A thrust reverser 2 has a movable thrust reverser door 7 comprising an outer surface panel 9, an inner surface panel 11 interconnected by a forward baffle 13 and a frame 12. A downstream rear collar 3 is fixed to the housing and defines the rearmost portion of the housing.

The thrust reverser door 7 is movable, in known fashion, between a closed, forward thrust position, shown in FIG. 1 and an open, thrust reversing position, shown in FIG. 2 by an actuator 7(a). The actuator 7(a) may comprise a cylinder attached to the frame 6 and having an extendible and retractable piston rod connected to the movable door 7. In its closed, or forward thrust position, the outer surface panel 9 of the thrust reverser door 7 is substantially flush with the outer surface panel 4 and the outer surface of rear collar 3 so as to provide a smooth air flow surface for the air passing in the direction of arrow 10. In its open or thrust reversing position, the rear portion of the door 7 blocks off the air flow duct and directs the air flowing through the duct, which normally flows in the direction of arrow 15, laterally outwardly through the opening in the housing in a direction having a rear thrust component. In order to maximize the efficiency of the door 7 when in the open position, baffle 13 extends beyond the surface of the inner panel 11 so as to redirect the air in a more forward direction thereby increasing the reverse thrust.

This configuration, when in the forward thrust position, creates a cavity 16 defined by inner panel 11, baffle 13, downstream air flow edge 8 and a line 14 defining the theoretical air flow between inner surface panel 5 and the rear collar 3 inner surface. The edge 8 is curved, as shown in FIG. 1, to allow air flow to pass through the housing during the reverse thrust operation. The cavity 16 creates disturbances in the air flow 15 through the cold flow duct when the thrust reverser door 7 is in its closed position resulting in a decrease in the overall efficiency of the turbofan.

Typical prior art thrust reversers can be found in French Pat. Nos. 2,486,153; 2,506,843; and 2,559,838. Attempts have been made to place the inner panel 11 in a position closer to the theoretical air flow line 14 when the thrust reverser door is in its closed position by either movably affixing the inner panel to the thrust reverser door, or forming baffle 13 such that it retracts when the door is in its closed position. Although the systems utilizing movable inner door panels and movable deflectors have somewhat alleviated the problem, these devices have increased complexity and manufacturing costs of the engine.

SUMMARY OF THE INVENTION

The present invention alleviates the air disturbance flow problems associated with the prior art thrust reversers by providing a movable air deflector which, in a first position, deflects the air passing through the cold flow air duct in a direction such that it approximates the theoretical air flow line and does not enter a cavity defined by the interior of the thrust reverser door when the door is in its closed position.

A linkage mechanism connects the air deflector to the door actuator, such that, when the door is moved to its opened or thrust reversing position, the deflector is moved to a second position so as to minimize its interference with the thrust reversing air flow.

The air deflector and its associated linkage are remarkably simple and are actuated by the movement of the thrust reversing door actuator. It obviates the need for a complex inner movable panel or a movable baffle proposed by the prior art solutions to this problem.

DETAILED DESCRIPTION OF THE PREFERRED EMBODIMENT

Figure 1:
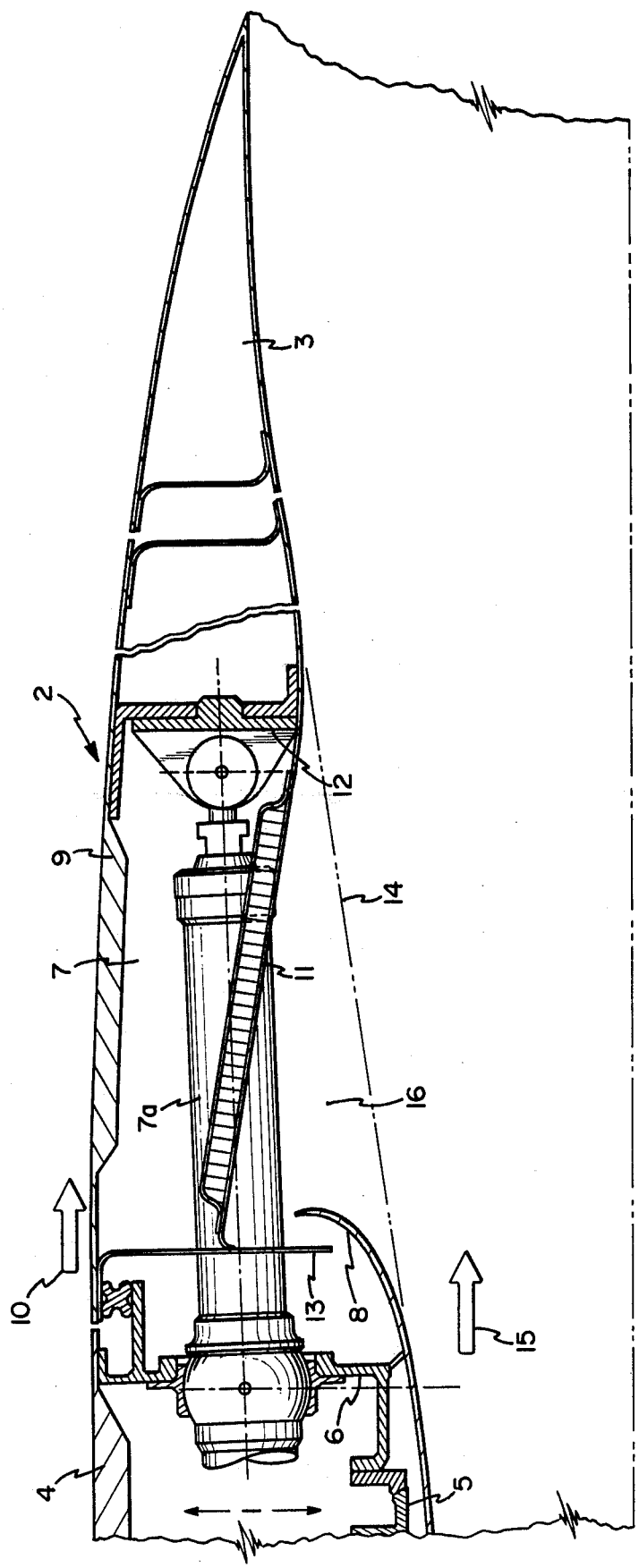
FIG. 1 is a partial, longitudinal cross-sectional view illustrating an outer housing of a turbofan engine and a thrust reversing door according to the prior art.
Figure 2:
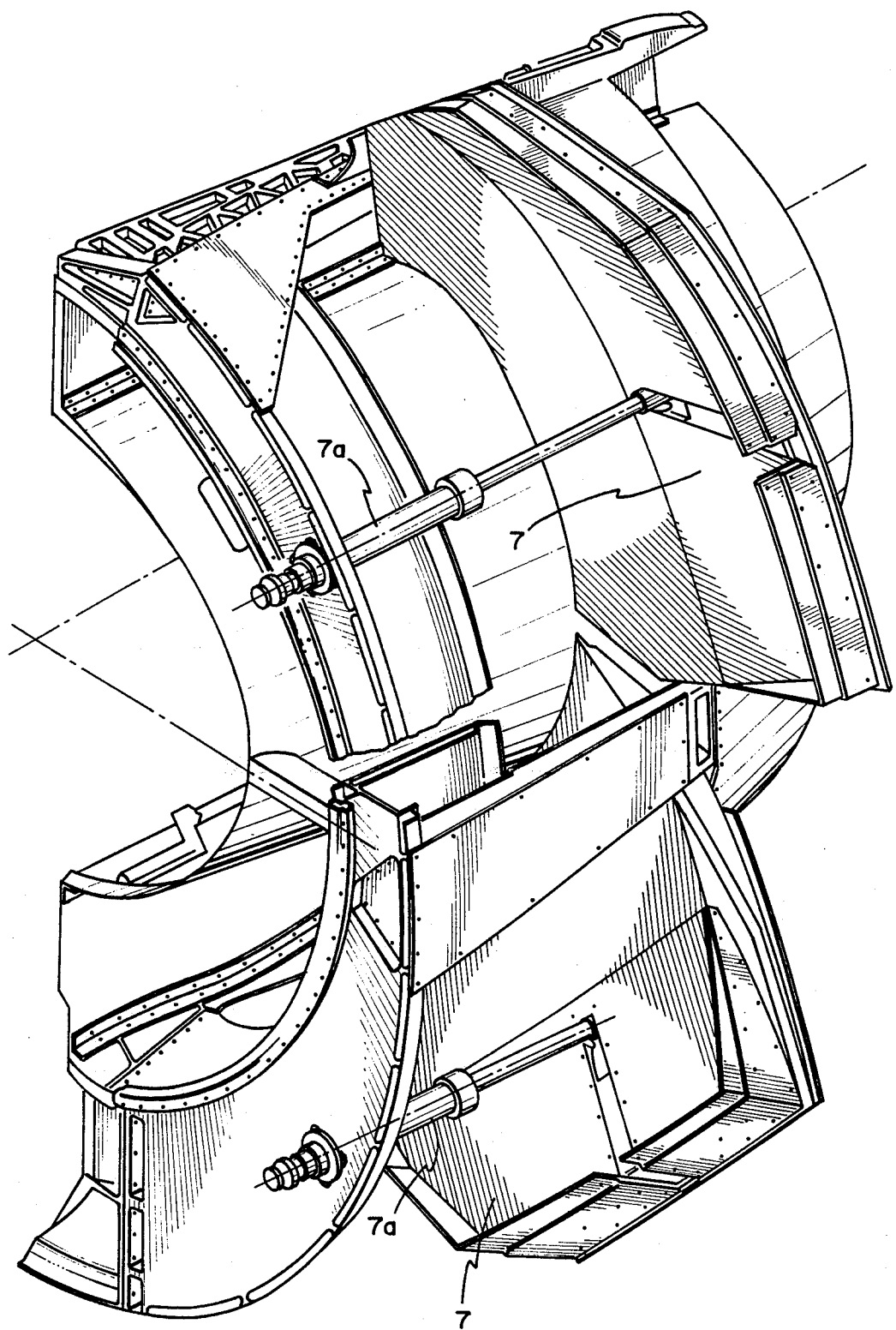
FIG. 2 is a partial, perspective view of the structure shown in FIG. 1 with the thrust reversing doors in open positions.
Figure 3:
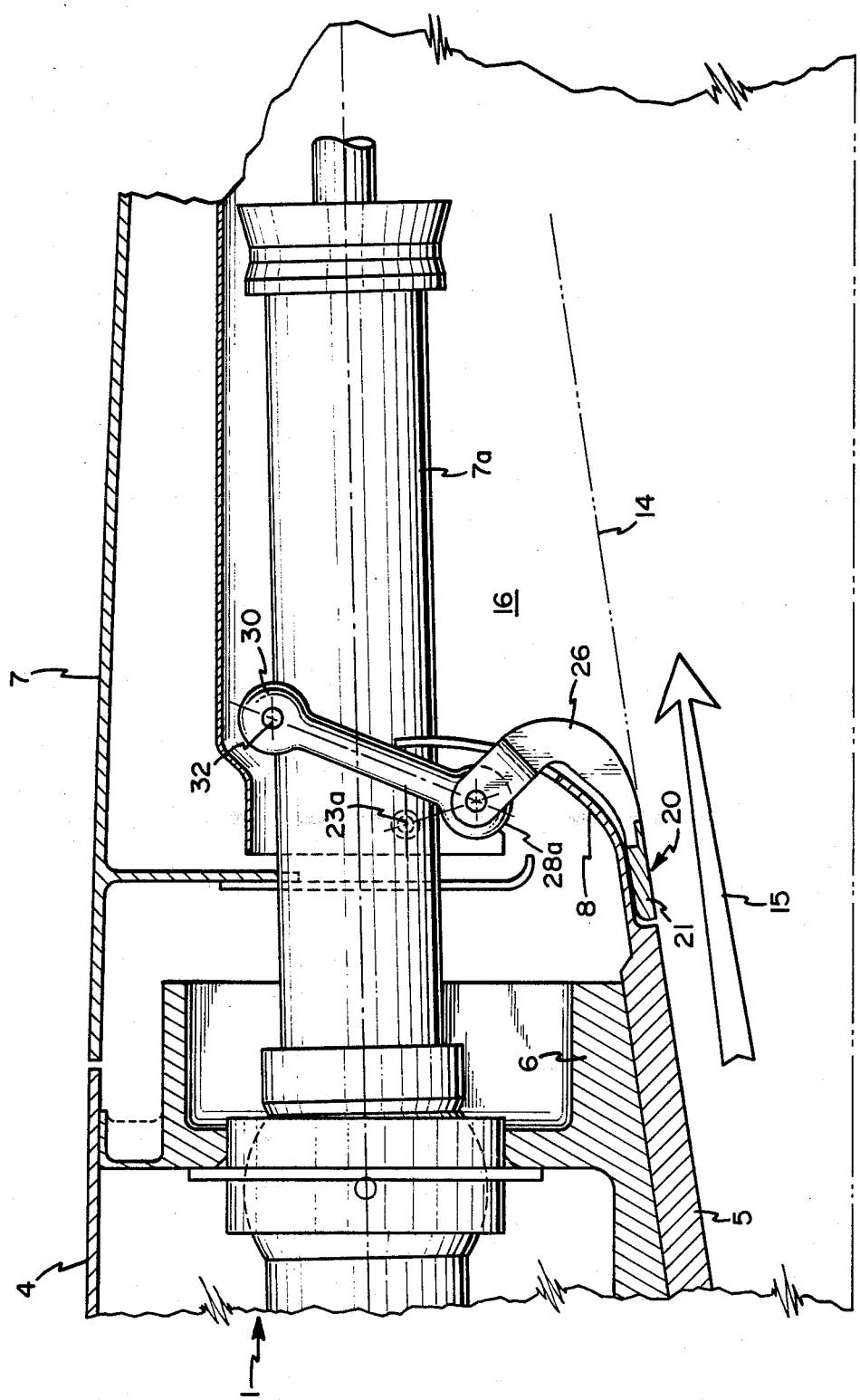
FIG. 3 is a partial, longitudinal cross-sectional view showing the air deflector according to the invention associated with a thrust reverser door in a closed position.
Figure 4:
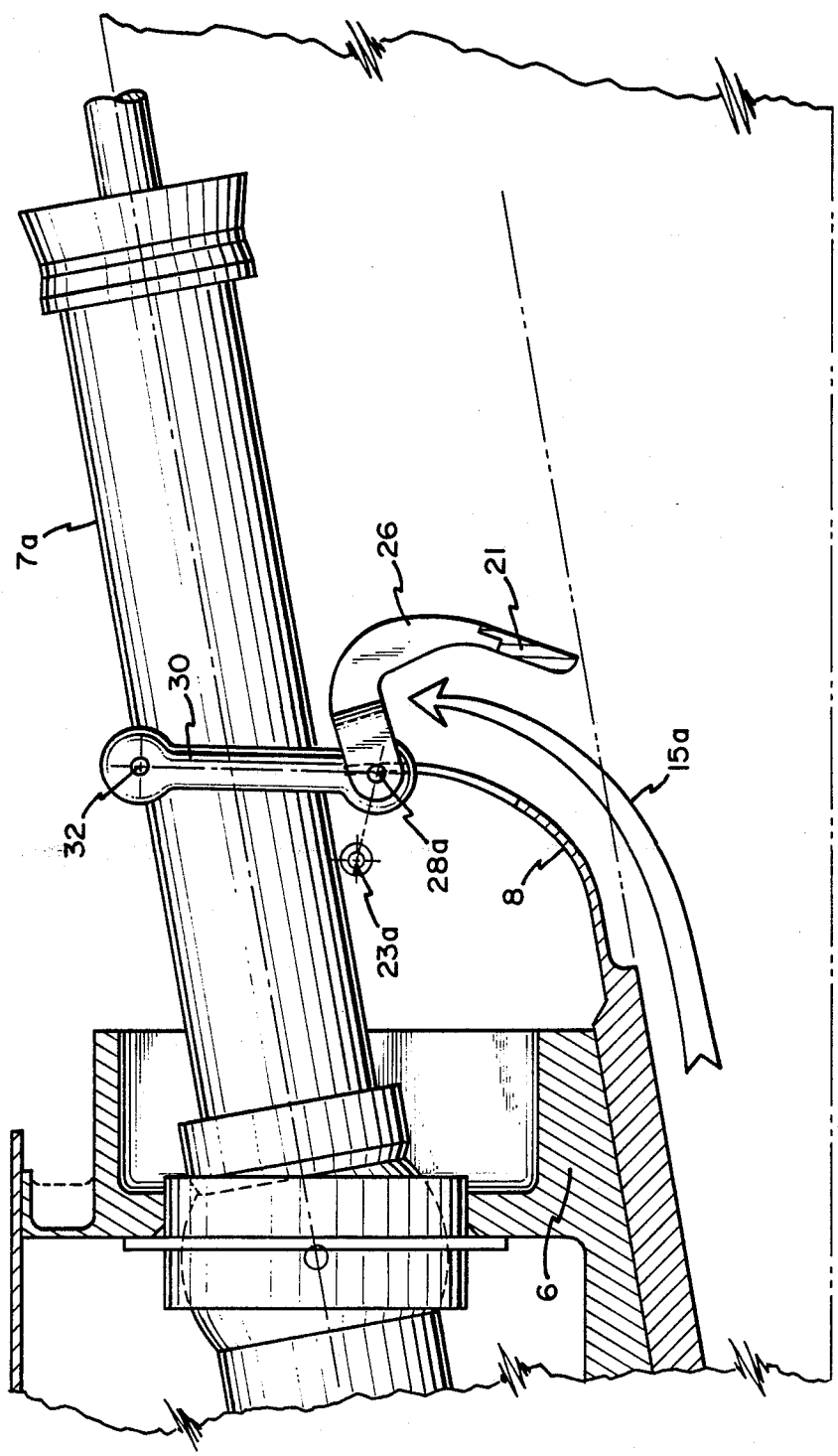
FIG. 4 is a partial, longitudinal cross-sectional view of the structure shown in FIG. 3 with the air deflector in an alternate position with the thrust reversing door opened.
Figure 5:
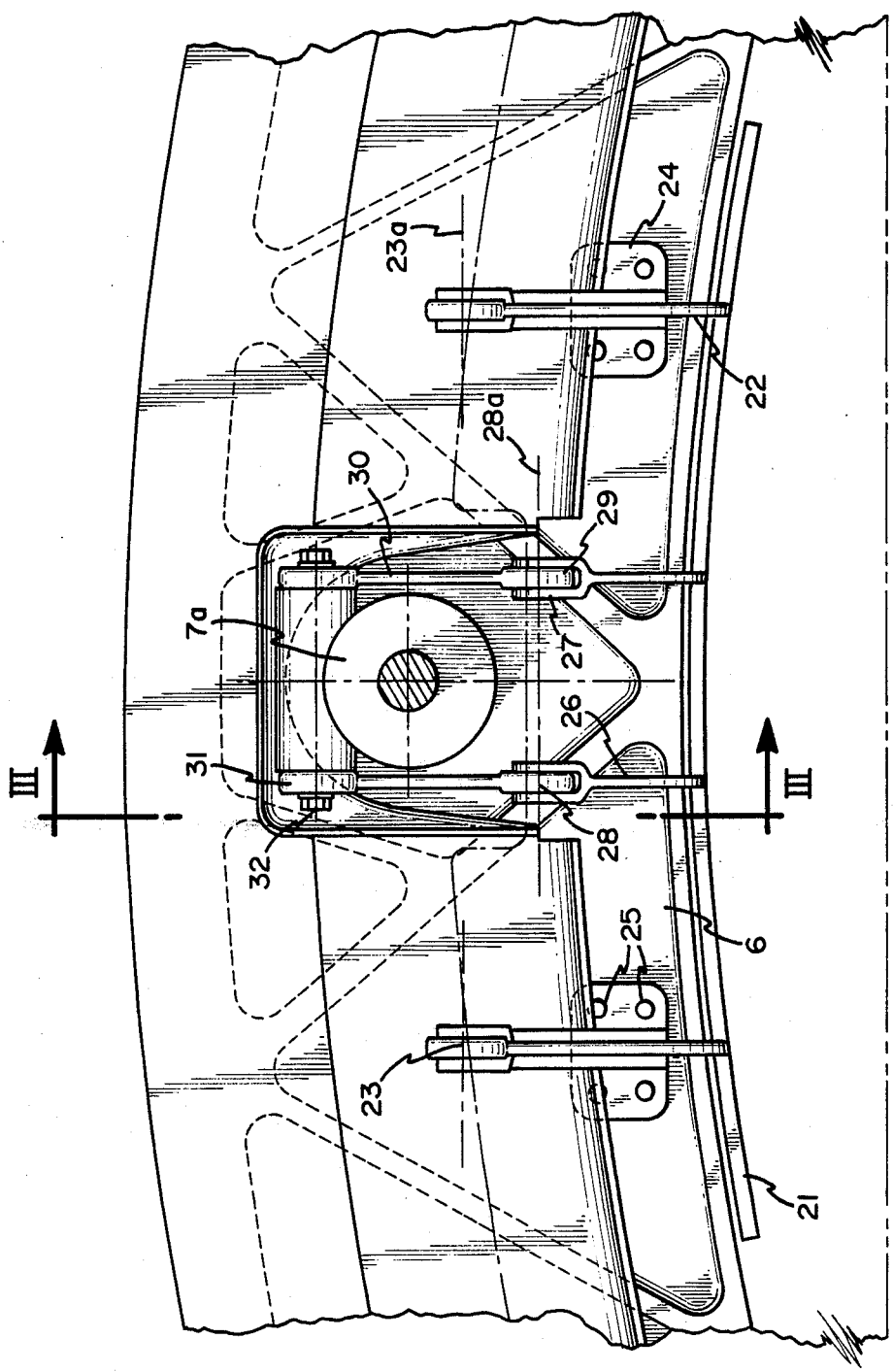
FIG. 5 is a partial, rear view of the structure shown in FIG. 3.

The deflector according to the invention is illustrated in FIGS. 3-5 wherein elements similar to the known structure illustrated in FIGS. 1 and 2 have been given the same numbers. Thus, the thrust reverser includes an upstream stationary housing 1 comprising an external panel 4, an internal panel 5 interconnected by a frame 6.

The actuator 7a is attached to the frame 6 such that its extendible and contractible piston rod opens and closes the door 7 as in the previously described prior art system.

The air deflector 20 comprises an arcuate segment deflector 21 having a circumferential length approximately equal to that of the thrust reverser door 7 movable between first and second positions. In the first position, as illustrated in FIG. 3, the air deflector 21 has an inner surface aligned with the inner surface of inner panel 5 which defines an outer boundary of the cold flow air duct. passing through the cold flow duct, in the direction of arrow 15 when the thrust reverser door is in its closed or forward thrust position, along the theoretical air flow line 14, thereby preventing the air from entering the cavity 16. Since the air passes substantially along the theoretical optimum air flow line 14, the perturbations or disturbances in the air flow presented by the cavity in the prior art systems are obviated. Wind tunnel test results have shown that the use of the deflector 21 results in a significant improvement in the air flow profile over the known systems having only the curved deflection edge 8, shown in FIG. 1.

If the air deflector 21 were permanently mounted in position adjacent to and aligned with the inner surface of inner panel 5, the thrust reversing mode would suffer a considerable loss in performance. Thus, the present invention also includes a linkage means to move the air deflector 21 to a second position during the reverse thrust operating mode in which the deflector has minimal influence on the air passing through the housing in this mode.

As best seen in FIGS. 4 and 5, the linkage mechanism comprises a pair of arms 22 having one end fixedly attached to the arcuate segment air deflector 21. The opposite ends of the arms 22 are pivotally attached at 23 to brackets 24 that are, in turn, fixedly attached to the frame 6 by screws 25 or the like. The brackets 24 pivotally support the air deflector 21 such that it may pivot about a first pivot axis 23a extending generally transverse to the longitudinal axis of the housing.

Link arms 26 also have one end fixedly attached to the deflector 21. The opposite ends of the link arms 26 define fork joints 27 and are pivotally attached to ends 29 of link arm 30 via pivot attachments 28. A second pivot axis 28a defined by pivot attachments 28 is generally parallel to the first pivot axis 23a, but is nonconcentric therewith, as illustrated in FIGS. 3 and 4. Link rods 30 have ends 31 pivotally attached to actuator 7a by pivots 32.

Thus, as the angular orientation of actuator 7a changes, as illustrated in FIGS. 3 and 4, as the door 7 moves from its closed to its open position, the geometry of the links and the supporting arms will cause the deflector 21 to move to the position shown in FIG. 4. In this position, the deflector 21 provides minimal disturbance to the air passing in the thrust reversing direction, as illustrated by arrow 15a in FIG. 4.

The foregoing description is provided for illustrative purposes only and should not be construed as in any way limiting this invention, the scope of which is defined solely by the appended claims.

We claim:

1. An air deflector for a thrust reverser of a turbofan-type turbojet engine having a generally annular outer housing having an inner surface defining an outer boundary of an air flow duct, at least one thrust reverser door movable between opened and closed positions, the thrust reverser door having an inner door panel defining a cavity with respect to an extension of the inner surface when the door is in its closed position, and an actuator to move the door between its opened and closed posiitons, the deflector comprising:

(a) a deflector with a generally arcuate segment shape having a deflector surface;
   (b) means to move the deflector between a first position wherein the deflector surface is adjacent to and aligned with the inner surface such that air flowing through the air flow duct passes along an extension of the inner surface and not into the cavity, and a second position wherein the deflector is displaced away from the inner surface so as to allow air to enter the cavity, wherein the means to move the deflector comprises linkage means interconnecting the deflector and the actuator such that the deflector is in its first position when the thrust reverser door is closed and in its second posiiton when the thrust reverser door is opened, the linkage means comprising:
      (i) a first link arm pivotally attached to the actuator;
      (ii) a second link arm having a first end fixedly attached to an arcuate segment and a second end; and
      (iii) second pivot means pivotally attaching the second end of the second link arm to the first link arm such that the first and second link arms may pivot with respect to each other about a second pivot axis extending generally parallel to, but non-coincident with the first pivot axis; and,
   (c) means to pivotally attach each arcuate segment to the outer housing comprising:
      (i) bracket means fixedly attached to the outer housing;
      (ii) arm means fixedly attached to the arcuate segment; and,
      (iii) pivot means pivotally attaching the arm means to the bracket means such that each arcuate segment pivots about a first pivot axis extending generally transverse to a longitudinal axis of the outer housing.

2. The deflector according to claim 1 wherein the turboject engine has a plurality of thrust reverser doors and wherein the number of deflectors equals the number of doors.

* * * * *

UNITED STATES PATENT AND TRADEMARK OFFICE
CERTIFICATE OF CORRECTION

PATENT NO. : 4,914,905
DATED : April 10, 1990
INVENTOR(S) : Claude A. G. DUBOIS et al It is certified that error appears in the above-identified patent and that said Letters Patent is hereby corrected as shown below:

Col. 3 line 12, after "air duct." the next sentence should begin with --The inner surface of the deflector 21 deflects the air--.

Claim 2, line 55, "turboject" should be --turbojet--.

Signed and Sealed this

Fifteenth Day of January, 1991

Attest:

HARRY F. MANBECK, JR.

*Attesting Officer*  *Commissioner of Patents and Trademarks*